(12) United States Patent
Ohtsuki (10) Patent No.: US 7,147,381 B2
(45) Date of Patent: Dec. 12, 2006

(54) WHEEL SUPPORT BEARING ASSEMBLY

(75) Inventor: Hisashi Ohtsuki, Iwata (JP)

(73) Assignee: NTN Corporation, Osaka (JP)

( * ) Notice: Subject to any disclaimer, the term of this patent is extended or adjusted under 35 U.S.C. 154(b) by 33 days.

(21) Appl. No.: 10/834,124

(22) Filed: Apr. 29, 2004

(65) Prior Publication Data

US 2004/0234183 A1 Nov. 25, 2004

(30) Foreign Application Priority Data

May 23, 2003 (JP) ............................ 2003-145988

(51) Int. Cl.
*F16C 19/28* (2006.01)
(52) U.S. Cl. ..................................... 384/537
(58) Field of Classification Search ................ 384/537, 384/544, 585, 589, 625
See application file for complete search history.

(56) References Cited

U.S. PATENT DOCUMENTS

| | | | |
|---|---|---|---|
| 6,478,471 B1* | 11/2002 | Ishida et al. ................. | 384/537 |
| 2002/0049091 A1 | 4/2002 | Ogura et al. | |
| 2002/0064327 A1 | 5/2002 | Toda et al. | |
| 2002/0146185 A1 | 10/2002 | Miyazaki et al. | |
| 2003/0060294 A1 | 3/2003 | Ouchi | |

FOREIGN PATENT DOCUMENTS

EP    1 110 756 A2    6/2001
EP    1 110 756 A3    6/2001

OTHER PUBLICATIONS

Niki Motoharu et al., Patent Abstracts of Japan, "Hub Unit Bearing", Publication No. 11-051064, Publication Date: Feb. 23, 1999.
European Search Report dated Sep. 21, 2005 for Application No. 04010807.8-2424.

* cited by examiner

*Primary Examiner*—Lenard A. Footland (57) ABSTRACT

A wheel support bearing assembly excellent in the strength and the creep resistance is provided. An inner member (3) of the bearing assembly includes a hub axle (4) made of carbon steel and having a radially outwardly extending hub flange (22) formed on an outer peripheral surface of the hub axle (4) at a location adjacent the outboard end thereof, and an inner race member (5). The hub axle (4) has a radially inwardly depressed mount (4a) defined on the outer peripheral surface thereof at a location adjacent the inboard end thereof, and the inner race member (5) is fixedly mounted on the depressed mount (4a). A raceway (3b) is defined in an outer peripheral surface of the inner race member (5). The inner race member (5) has a radially inner end edge, delimited between an inner peripheral surface thereof and an annular inboard end face thereof, which edge is chamfered to represent a rounded inner end corner (5a), and is fixed on the depressed mount (4a) by means of an annular end stop (4c) that is formed by staking the inboard end of the hub axle so as to protrude radially outwardly. The hub axle (4) also includes a hardened layer (20) formed on a surface portion of the outer peripheral surface thereof at a region between a root (22a) of the hub flange (22) and the depressed mount (4a). An inboard end of the hardened layer extends to a position between the raceway (3b) and the rounded inner end corner (5a) of the inner race member (5).

5 Claims, 9 Drawing Sheets

WHEEL SUPPORT BEARING ASSEMBLY

BACKGROUND OF THE INVENTION

1. Field of the Invention

The present invention relates generally to a wheel support bearing assembly in the form of a hub-bearing assembly and, more particularly, to the wheel support bearing assembly having a relatively high load bearing capacity, which is suitably used in commercial vehicles such as trucks and station wagons and also in passenger cars in general.

2. Description of the Related Art

A vehicle wheel support bearing assembly for passenger cars, of a kind utilizing an angular contact ball bearing has developed from the first generation bearing, in which a seal-equipped dual row rolling bearing is used, to the second generation hub bearing, in which an outer race concurrently serves as a flanged wheel hub and, then, from the third generation bearing, in which inner and outer races include flanges, to the fourth generation bearing of a type integrated with a constant velocity universal joint.

Figure 12:
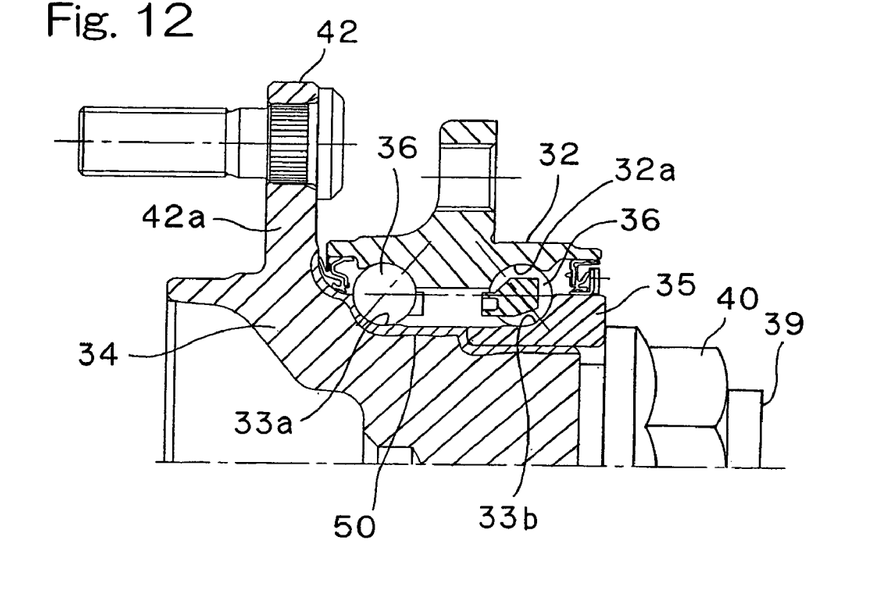
FIG. 12 is a fragmentary longitudinal sectional view of one conventional wheel support bearing assembly.
Figure 13:
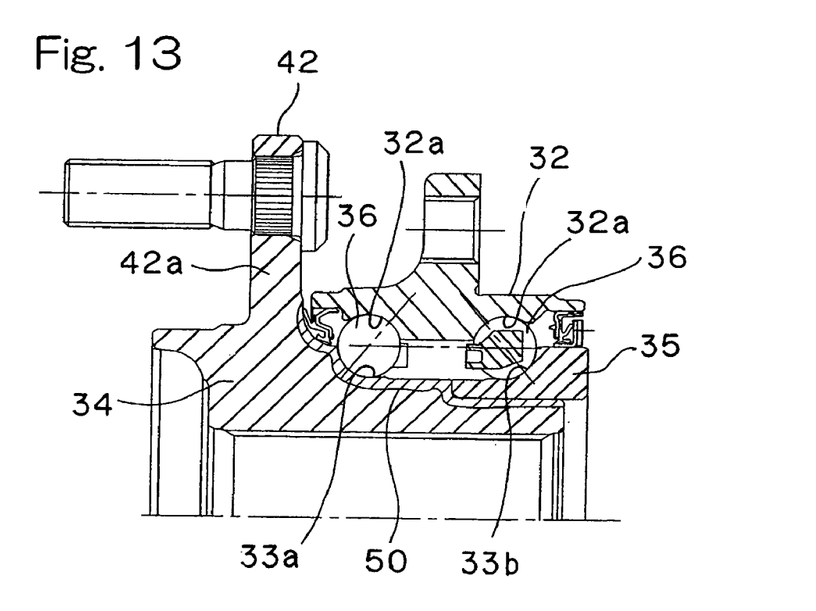
FIG. 13 is a fragmentary longitudinal sectional view of another conventional wheel support bearing assembly.

The third generation wheel support bearing assembly includes, as shown in FIGS. 12 and 13, a hub axle 34 which forms a part of a rotatable inner member and which has an outboard raceway groove 33a defined on an outboard outer peripheral surface thereof, and a non-rotatable flanged outer member 32, and a separate inner race member 35 mounted on the inboard outer peripheral surface of the hub axle 34 and having an outer peripheral surface formed with an inboard raceway groove 33b. The wheel support bearing assembly shown in FIG. 12 is used for rotatably supporting a vehicle driven wheel, whereas the wheel support bearing assembly shown in FIG. 13 is used for rotatably supporting a vehicle drive wheel. In the wheel support bearing assembly of FIG. 12, a nut 40 is threadedly mounted on an externally threaded portion 39 so formed as to protrude from an inboard end of the hub axle 34 to fix the inner race member 35 immovable on the hub axle 34 in an axial direction of the wheel support bearing assembly.

The Japanese Laid-open Patent Publication No. 11-51064 discloses a wheel support bearing assembly utilizing a tapered roller bearing. To describe this realted art wheel support bearing assembly with the aid of FIG. 12 or 13, the patent publication suggests a hardened layer 50 formed on a portion of the outer peripheral surface of the hub axle 34 so as to extend axially between the inboard end thereof and a root 42a of a flange 42, which layer 50 is formed by means of a high frequency heating technique.

A portion of the hardened layer 50 adjacent the root 42a of the flange 42 serves to enhance the rigidity of the flange 42. Considering that, in the wheel support bearing assembly having a high load bearing capacity, such as used in trucks and station wagons, increase of the rigidity of the flange and its surrounding portion has been required, the use of the hardened layer 50 appears to effectively satisfy this requirement.

On the other hand, another portion of the hardened layer 50 where the inner race member 35 rests serves to increase the creep resistance of the interface between the hub axle 34 and the inner race member 35. While attempts have been made to apply a friction preventing agent to the interface between the inner race member 35 and the outer peripheral surface of the hub axle 34, this application is complicated and time-consuming and, therefore, it has been desired to increase the creep resistance by the utilization of the hardened layer 50.

In the third generation wheel support bearing assembly of an inner race rotating type, however, instead of the use of the bolt and nut for fixing the inner race member on the hub axle such as shown in FIG. 12, it is now a mainstream to use the structure in which the inboard end of the hub axle is staked to fix the inner race member on the hub axle.

Although the structure in which the inner race member 35 is fixed by staking appears to be excellent in terms of productivity and cost, cracking tends to occur in the hardened layer 50 if the inner end of the hub axle is staked while the hardened layer 50 on the outer peripheral surface portion of the hub axle 34 has been formed so as to extend to the inboard end of the hub axle 34. As a result, the inner race member 35 fails to be fixed in position. Also, if the hardened layer 50 extends only to a position away from the inboard end of the inner race member 34, it would be difficult to increase the strength of the hub axle 34 and also to secure the creep resistance at the interface between the inner race member 35 and the hub axle 34.

SUMMARY OF THE INVENTION

Accordingly, the present invention has for its object to provide an improved wheel support bearing assembly of a structure in which an inner race member is fixed on a hub axle by staking an inboard end of the hub axle and a hardened layer is formed on a portion of an outer peripheral surface of the hub axle, which assembly allows the staking to be achieved satisfactorily and, also, allows the hardened layer to be formed satisfactorily to secure the strength of the hub axle and the creep resistance.

In order to accomplish the foregoing object, the present invention provides a wheel support bearing assembly for rotatably supporting a vehicle wheel, which includes an outer member having an inner peripheral surface formed with a plurality of first raceways; an inner member relatively rotatably positioned inside the outer member and having a corresponding number of second raceways defined therein in alignment with the first raceways in the outer member; and rows of rolling elements rollingly received in part within the first raceways and in part within the second raceways.

The inner member includes a hub axle having outboard and inboard ends opposite to each other and made of carbon steel, a hub flange integrally formed on an outer peripheral surface of the hub axle at a location adjacent the outboard end thereof so as to extend radially outwardly therefrom, and an annular inner race member. The hub axle has a radially inwardly depressed mount defined on the outer peripheral surface of the hub axle at a location adjacent the inboard end thereof. One of the second raceways in the inner member is defined in an outer peripheral surface of the annular inner race member while the other second raceway is defined in the outer peripheral surface of the hub axle.

The annular inner race member has a radially inner end edge, delimited between an inner peripheral surface thereof and an annular inboard end face thereof, which edge is chamfered to represent a rounded inner end corner, and is fixed on the radially inwardly depressed mount by means of an annular end stop that is formed by bending or staking the inboard end of the hub axle so as to protrude radially outwardly.

The hub axle also includes a hardened layer formed on a portion of the outer peripheral surface thereof that is delimited between a root of the hub flange on an inboard side thereof and the depressed mount. An inboard end of the hardened layer is positioned to extend to a position between such one of the second raceways and the rounded inner end corner of the inner race member.

According to the present invention, the hardened layer on the hub axle does not extend to the rounded inner end corner of the inner race member where the cylindrical inboard end of the hub axle is bent to provide the annular end stop and, therefore, the hardened layer does not provide any obstruction to the bending of that inboard end of the hub axle to define the annular end stop with which the inner race member is held in position immovable axially on the hub axle. Also, the cylindrical inboard end of the hub axle can be efficiently staked with no cracking occurring in the hardened layer.

Also, since the inboard end of the hardened layer on the hub axle extends to a position between such one of the second raceways defined in the inner race member and the inboard end of the hub axle, the purpose of formation of the hardened layer can effectively be satisfied and effects of use of the hardened layer can also be obtained satisfactorily. In other words, an axial region of the interface between the hub axle and the inner race member, where one of the second raceways tends to be imposed with a radial load, is formed with the hardened layer and the inner race member contacts the hub axle through the hardened layer within such axial region. Accordingly, not only can the creep resistance of the hub axle be secured satisfactorily, but the strength of the hub flange on the hub axle and portions around the hub flange can also be secured advantageously.

The hardened layer may have a surface hardness within the range of 58 to 60 HRC and may extend a depth of penetration not smaller than 0.5 mm. If the surface hardness of the hardened layer on the hub axle is within the range of 58 to 60 HRC, the rigidity of the hub flange can be increased with the amount of deformation of the hub flange consequently decreased during turn of a vehicle. As such, the rigidity of the vehicle around the wheel can be increased advantageously. These advantages can not be attained where the depth of the hardened layer is smaller than 0.5 mm.

Preferably, the wheel support bearing assembly may utilize either a double row angular contact ball bearing or a double row tapered roller bearing.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A wheel support bearing assembly according to a first preferred embodiment of the present invention will be described with particular reference to FIGS. 1A to 3. The wheel support bearing assembly 1 is a hub-bearing assembly, utilizing a double row angular contact ball bearing, and is shown as applied to support a driven wheel.

Figure 1A:
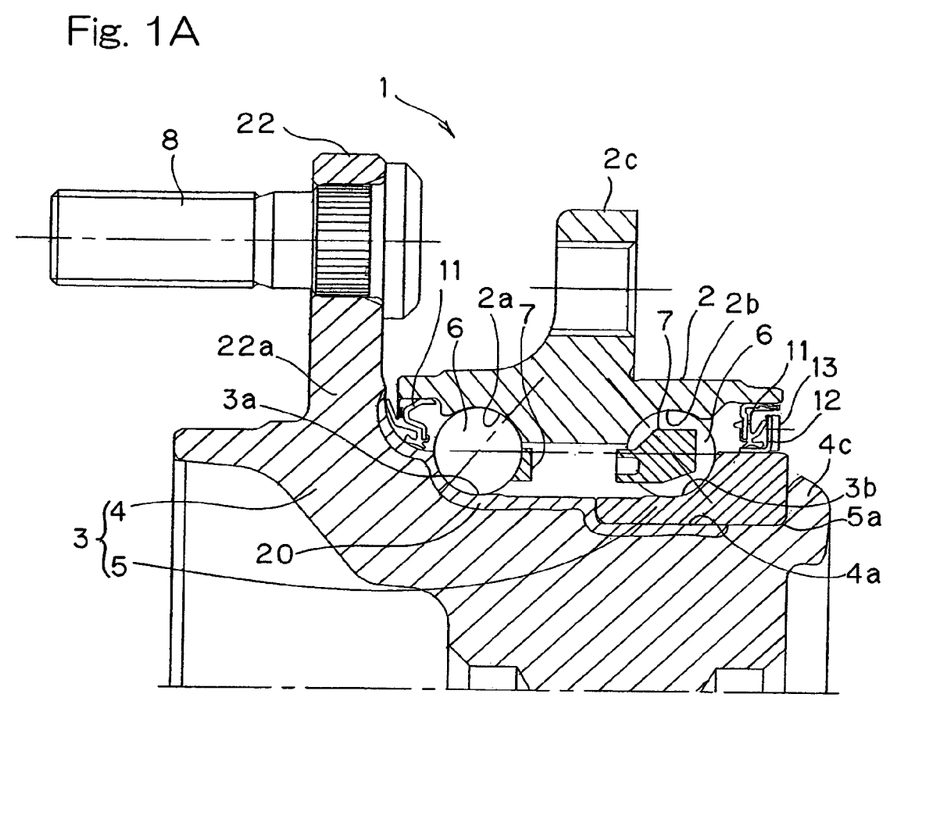
FIG. 1A is a fragmentary longitudinal sectional view of a wheel support bearing assembly according to a first preferred embodiment of the present invention.

As shown in FIG. 1A, the wheel support bearing assembly 1 includes an outer member 2 having an inner peripheral surface formed with outboard and inboard raceway grooves 2a and 2b, an inner member 3 having an outer peripheral surface formed with outboard and inboard raceway grooves 3a and 3b that are aligned with the outboard and inboard raceway grooves 2a and 2b in the outer member 2, respectively, and circumferentially extending rows of rolling elements 6 accommodated within an annular working space, delimited between the outer and inner members 2 and 3, and accommodated rollingly in part within the outboard and inboard raceway grooves 2a and 2b and in part within the outboard and inboard raceway grooves 3a and 3b. The rolling elements 6 of each circumferential row are in the form of a ball and are operatively retained in position by a retainer or cage 7.

The inner member 3 includes a hub axle 4 having outboard and inboard ends opposite to each other with a radially outwardly extending hub flange 22 formed on a portion of the hub axle 4 adjacent the outboard end, and an inner race member 5 fixedly mounted on an outer peripheral surface of the hub axle 4 at a location adjacent the inboard end thereof. The hub axle 4 has the outboard raceway groove 3a defined on the outer peripheral surface of the hub axle 4 at a location adjacent to and on an inboard side of the hub flange 22 and also has an radially inwardly depressed mount 4a defined on the outer peripheral surface of the hub axle 4 at a location adjacent to and axially inwardly of the inboard end thereof.

The inner race member 5 is mounted on the depressed mount 4a of the hub axle 4 while the inboard raceway groove 3b is in practice defined on an outer peripheral surface of the inner race member 5. This inner race member 5 has a cylindrical bore defined therein for receiving the hub axle 4 and also has a radially inner end edge, delimited between an inner peripheral surface thereof and an annular inboard end face thereof, which is chamfered to represent a rounded inner end corner 5a.

Mounting of the inner race member 5 onto the depressed mount 4a of the hub axle 4 is carried out in the following manner. Specifically, the inboard end of the hub axle 4, prior to the inner race member 5 being mounted thereon, forms a cylindrical portion 4b shown in FIG. 3 and, after the inner race member 5 has been mounted on the hub axle 4, the cylindrical portion 4b is bent so as to protrude radially outwardly to define an annular end stop 4c with which the inner race member 5 is held in position immovable axially and is hence prevented from being separated from the hub axle 4. A brake rotor 23 and a driven wheel 24 having a wheel disc 24a mounted thereon are firmly connected to the hub flange 22 by means of a plurality of hub bolts 8 that pass through bolt holes in the hub flange 22 with associated nuts 9 threaded onto the bolts 8 as shown in FIG. 2.

Figure 2:
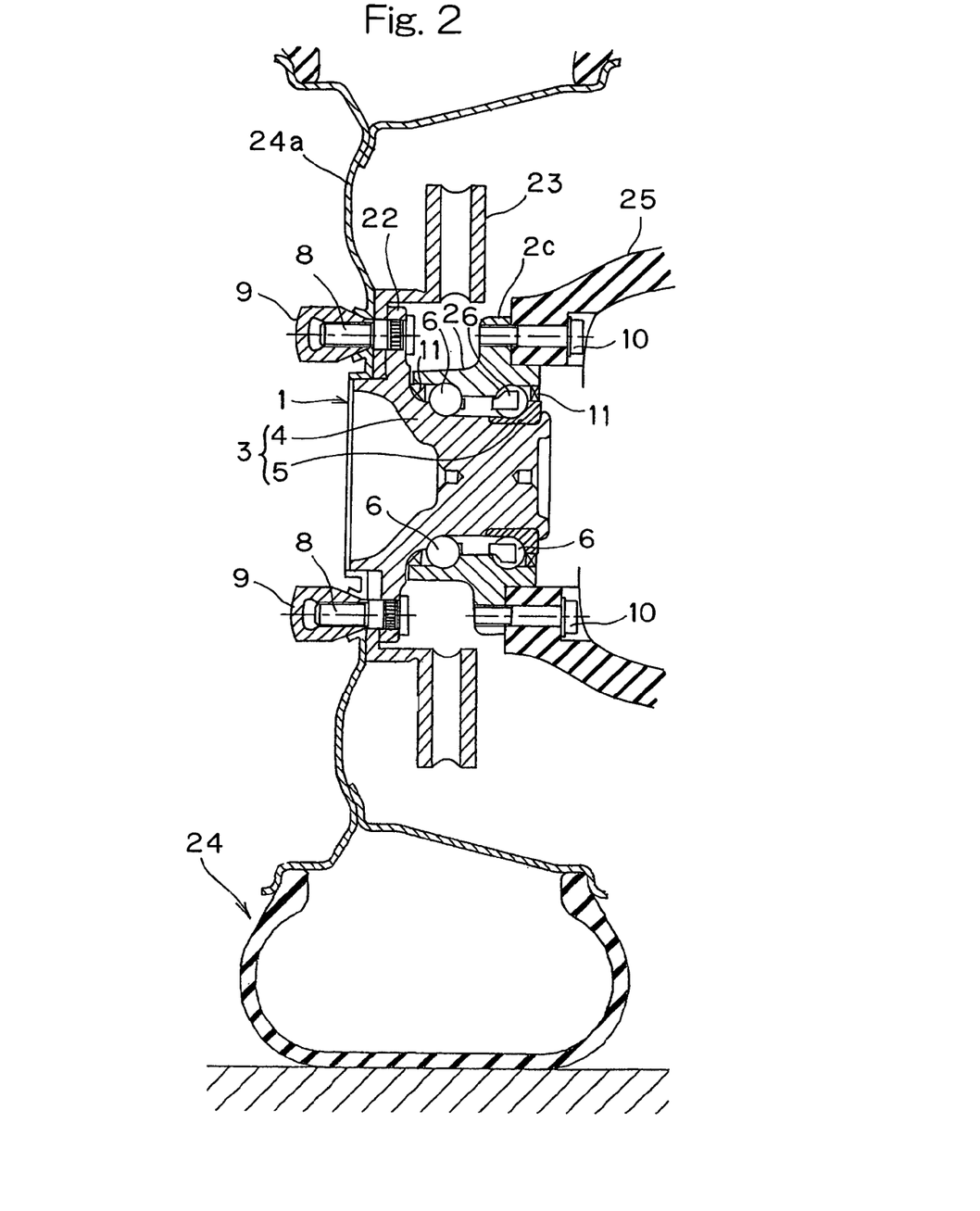
FIG. 2 is a longitudinal sectional view of the wheel support bearing assembly of FIG. 1A applied to a driven wheel.
Figure 3:
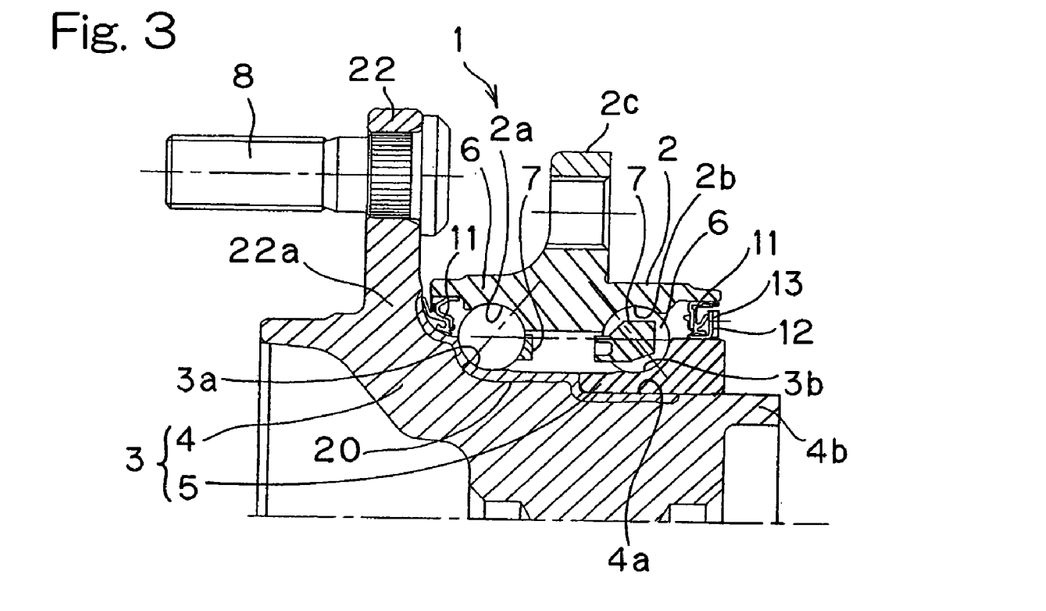
FIG. 3 is a fragmentary longitudinal sectional view of the wheel support bearing assembly during the assembly.

The outer member 2 has an outer peripheral surface formed with a mounting 2c in the form of a radially outwardly extending flange, so that as best shown in FIG. 2, the outer member 2 can be connected through the mounting 2c by means of a plurality of knuckle bolts 10 to a knuckle 25 that forms a part of a wheel suspension system carried by a vehicle body structure. Opposite outboard and inboard ends of the outer member 2 are provided with respective sealing members 11 such as oil seals that seal outboard and inboard open ends of the annular working space delimited between the outer and inner members 2 and 3. The inboard sealing member 11 is in sliding contact with an inboard sealing ring 12 mounted on the outer peripheral surface of the inner race member 5. The sealing ring 12 carries an encoder 13 that is to be detected by a rotation detecting sensor (not shown) operable to provide an electric signal indicative of the number of revolution of the inner member 3 and, hence, the driven wheel 24.

The hub axle 4 is made of carbon steel such as the one corresponding to S50C to S70C as stipulated in the JIS (Japanese Industrial Standards) and is formed with a hardened layer 20 of a predetermined depth on its outer peripheral surface region that extends between a portion of the depressed mount 4a and the root 22a of the hub flange 22. This hardened layer 20 is formed by the use of a high frequency heating technique and has a surface hardness within the range of 58 to 60 HRC. The depth of the hardened layer 20 is chosen to be not smaller than 0.5 mm and preferably within the range of 1.0 mm and 4.0 mm.

Figure 1B:
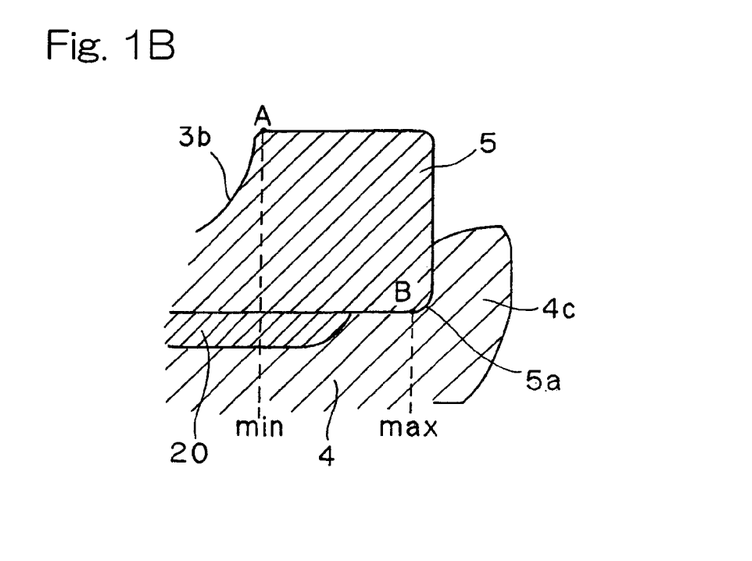
FIG. 1B is a sectional view, on an enlarged scale, of a portion of the wheel support bearing assembly shown in FIG. 1A.

As shown in FIG. 1B on an enlarged scale, an inboard end of the hardened layer 20 on the depressed mount 4a adjacent the rounded inner end corner 5a of the inner race member 5 is so positioned as to extend to a position between an inboard terminating edge A of the inboard raceway groove 3b in the inner race member 5 and an inner end edge B of the rounded inner end corner 5a.

With the wheel support bearing assembly of the structure described hereinabove, since the hub axle 4 is made of carbon steel and has the outer peripheral surface region formed with the hardened layer 20 extending between that surface portion of the depressed mount 4a and the root 22a of the hub flange 22, that outer peripheral surface region of the hub axle 4 can have an increased rigidity enough to reduce the amount of deformation of the hub flange 22 which would tend to occur during cornering of an automotive vehicle. Because of this, the rigidity can advantageously be increased around the vehicle wheel.

Also, since the hardened layer 20 extends to the depressed mount 4a, an undesirable creep tending to occur at the interface between the inner peripheral surface of the inner race member 5 and the outer peripheral surface of the hub axle 4 can be suppressed advantageously. Accordingly, the possibility of the inner race member 5 being damaged in the presence of rusting, friction induced particles and/or galling at the interface between the inner race member 5 and the hub axle 4, which would occur as a result of the creep, can advantageously be eliminated to thereby increase the durability of the inner race member 5. The hardened layer 20 has a surface hardness within the range of 58 to 60 HRC and, therefore, the strength of the hub axle 4 and the creep resistance can further be increased advantageously.

The inboard end of the hardened layer 20 on the hub axle 4 does not extend to the rounded inner end corner 5a of the inner race member 5 where the cylindrical portion 4b (FIG. 3) of the hub axle 4 is bent or staked to fix the inner race member 5 to the hub axle 4 and, therefore, the hardened layer 20 does not provide any obstruction to the bending of the cylindrical portion 4b of the hub axle 4 to define the annular end stop 4c with which the inner race member 5 is held in position immovable axially.

Also, advantageously, the inner race member 5 can be fixedly mounted on the hub axle 4 with no cracking occurring in the hardened layer 20. Also, the inboard end of the hardened layer 20 extends to a position beyond the inboard terminating edge A (FIG. 1B) of the inboard raceway groove 3b, securing the strength of the hub axle 4 and the creep resistance.

Figure 4:
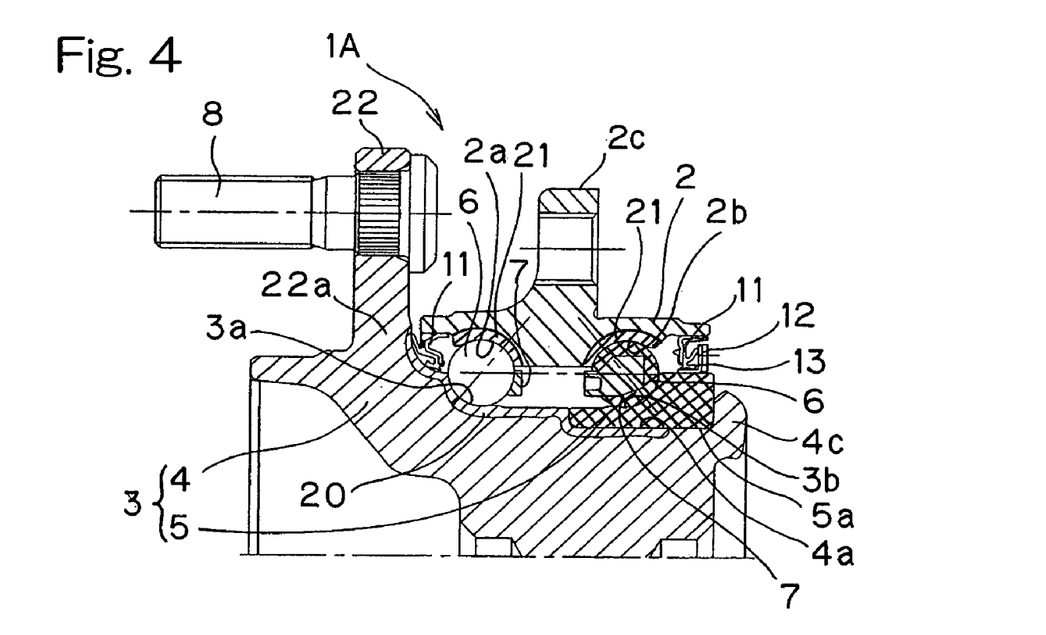
FIG. 4 is a fragmentary longitudinal sectional view of the wheel support bearing assembly according to a second preferred embodiment of the present invention.

In a second preferred embodiment of the present invention shown in FIG. 4, the wheel support bearing assembly, now identified by 1A, is substantially similar to the wheel support bearing assembly 1 in the foregoing embodiment, except that the outer member 2 is made of the same carbon steel as that used to form the hub axle 4 and respective semicircular surface areas of the outboard and inboard raceway grooves 2a and 2b in the outer member 2 are each formed with a hardened layer 21 of a predetermined depth by the use of a high frequency heating technique. The hardened layer 21 in each of the outboard and inboard raceway grooves 2a and 2b has a hardness within the range of 58 to 60 HC as is the case with that of the hardened layer 20 in the hub axle 4.

Also, the inner race member 5 and the inboard row of the rolling elements 6 are made of bearing steel (corresponding to SUJ as stipulated in the JIS) which has been immersed and quenched in liquid such as oil (hereinafter referred to as "liquid quench") and those liquid-quenched parts have a surface hardness not lower than 60 HRC. On the other hand, the outboard row of the rolling elements 6 are made of carburized steel as is the case with those employed in the conventional bearing assembly, but the outboard row of the rolling elements 6 may also be made of the bearing steel which has been quenched in liquid as is the case with the inboard row of the rolling elements 6.

Other structural features of the wheel support bearing assembly 1A than those described above are similar to those of the wheel support bearing assembly 1 in the foregoing embodiment and, therefore, will not be reiterated for the sake of brevity.

According to the second embodiment of the present invention, the outer member 2 is made of carbon steel and the semicircular surface areas of the outboard and inboard raceway grooves 2a and 2b in the outer member 2 are also formed with the respective hardened layers 21 having the surface hardness within the range of 58 to 60 HRC and, therefore, the outer member 2 can have an increased durability.

It is to be noted that, as a characteristic peculiar to this type of bearing assembly, the inboard raceway groove 3b formed on the inner race member 5 tends to bear a load higher than the outboard raceway groove 3a. The load herein means a load including the axial load during cornering of the vehicle and the radial load (the vehicle body weight) both imposed on the raceway groove from the road surface on which the tire rests. However, the use of the inner race member 5 and the inboard row of the rolling elements 6 both made of the liquid-quenched bearing steel having a hardness not lower than 60 HRC is effective to increase the lifetime of the inner race member 5 having the inboard raceway groove 3b and also to allow the rolling elements 6 of the inboard row to exhibit a sufficient strength against a potential internal cracking, even when a large load is imposed on the rolling elements 6 as a result of the wheel riding over a curb.

While the inner race member on the inboard side has hitherto been made of bearing steel that has been carburized to have a case hardened layer, the liquid-quenched bearing steel such as used in the practice of the present invention has been improved in quality as a result of improvement of steel refinement. The liquid-quenched bearing steel has a fatigue life longer than that exhibited by the carburized steel with little pinched contaminant and it has therefore been found that even under severe surface pressures the inner race member 5 can have an increased lifetime.

It is to be noted that since the lifetime of the raceway grooves depends not only on hardness but also on residue compressive stresses on the surface and the amount of austenite contained therein, it is not necessarily appropriate to discuss over the hardness as determinative of the lifetime, but data are available which show that the lifetime of the raceway grooves decreases as the hardness decreases. For example, a raceway groove of steel material having a hardness of 60 HRC has a lifetime 1.8 times longer than that of a raceway groove of the same steel material having a hardness of 58 HRC.

It is, however, to be noted that, in the embodiment shown in and described with reference to FIG. 4, the hardened layer 21 may be provided in the outer member 2 and both of the inner race member 5 and the rolling elements 6 on the inboard and outboard sides may be made of carburized steel. Alternatively, without providing the hardened layer 21 in the outer member 2, both of the inner race member 5 and the rolling elements 6 on the inboard and outboard sides may be made of liquid-quenched bearing steel.

Figure 5:
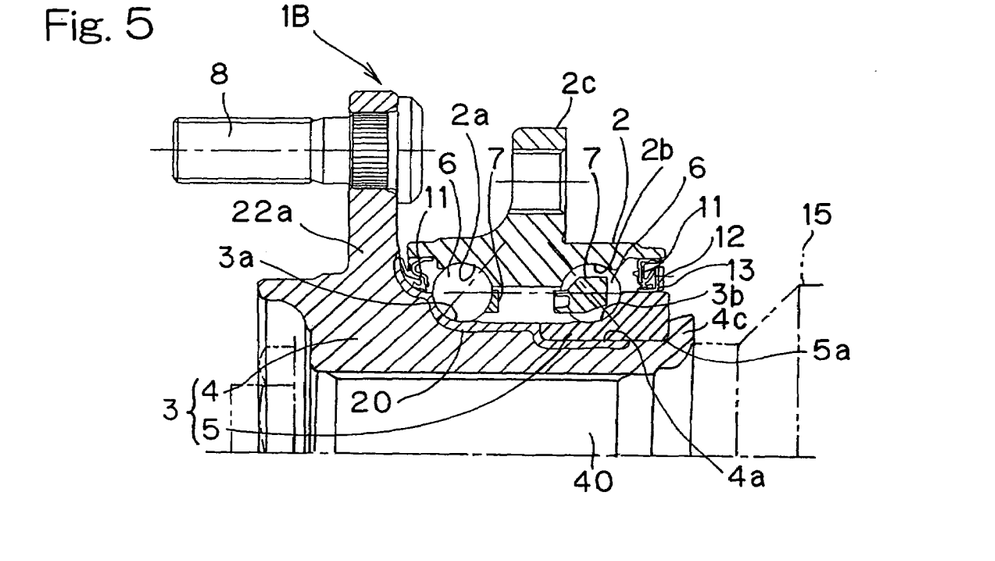
FIG. 5 is a fragmentary longitudinal sectional view of the wheel support bearing assembly according to a third preferred embodiment of the present invention.

FIG. 5 illustrates a third preferred embodiment of the present invention. The wheel support bearing assembly identified by 1B in FIG. 5 is similar to the wheel support bearing assembly shown in and described with reference to FIGS. 1 to 3, but is applied to support a drive wheel. In this embodiment, the hub axle 4 has an axially extending bore 40 defined therein for receiving a shank provided on one end, for example, an outer race of a constant velocity universal joint 15, so that the hub axle and, hence, the vehicle wheel can rotate together with the shank of the constant velocity universal joint 15.

Other structural features of the wheel support bearing assembly 1B than those described above are similar to those of the wheel support bearing assembly 1 in the previously described first embodiment and, therefore, will not be reiterated for the sake of brevity.

Figure 6:
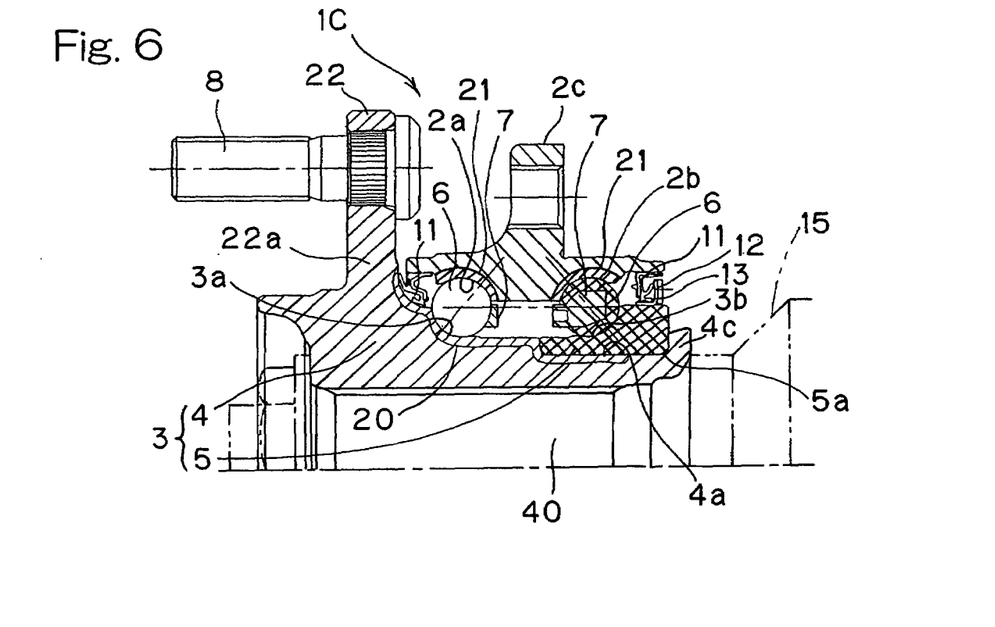
FIG. 6 is a fragmentary longitudinal sectional view of the wheel support bearing assembly according to a fourth preferred embodiment of the present invention.

In a fourth preferred embodiment of the present invention shown in FIG. 6, the wheel support bearing assembly 1C is similar to the wheel support bearing assembly 1A of FIG. 4 in the form of the double row angular contact ball bearing assembly, but is applied to support a drive wheel while the assembly 1A is applied to support a driven wheel. Even in this embodiment of FIG. 6, the hub axle 4 has the axially extending bore 40 defined therein for receiving a shank provided on the constant velocity universal joint 15.

Other structural features of the wheel support bearing assembly 1C than those described above are similar to those of the wheel support bearing assembly 1A in the previously described second embodiment and, therefore, will not be reiterated for the sake of brevity.

Figure 7:
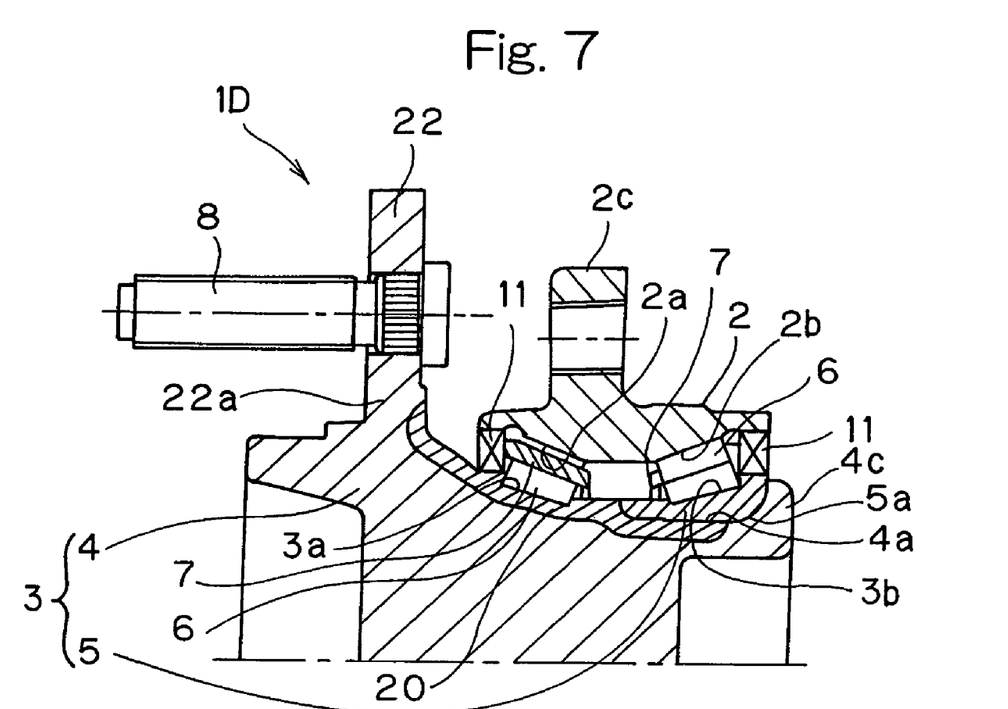
FIG. 7 is a fragmentary longitudinal sectional view of the wheel support bearing assembly according to a fifth preferred embodiment of the present invention.
Figure 8:
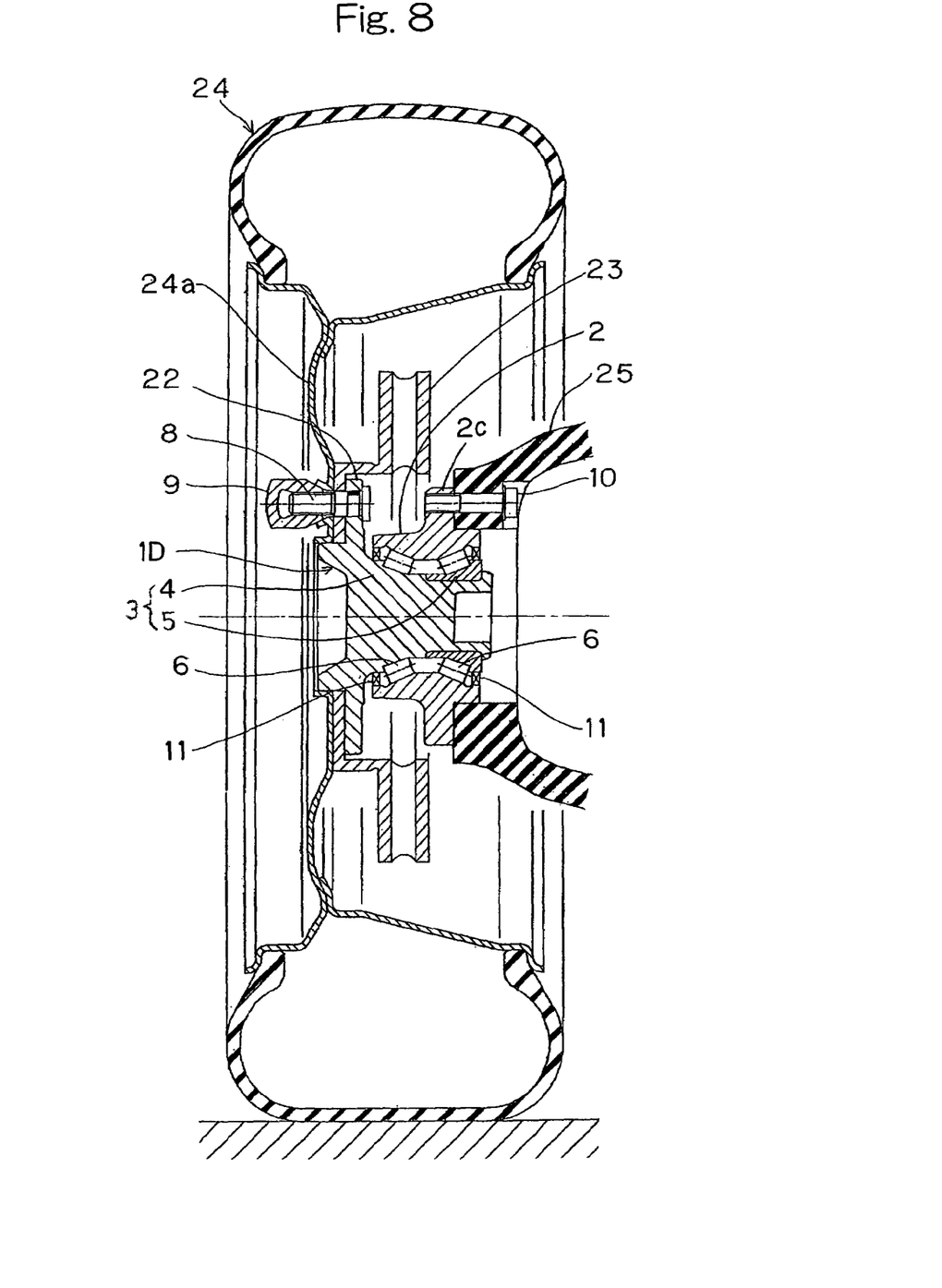
FIG. 8 is a longitudinal sectional view of the wheel support bearing assembly of FIG. 7 applied to a driven wheel.

Referring now to FIGS. 7 and 8, there are shown a wheel support bearing assembly 1D according to a fifth preferred embodiment of the present invention. The wheel support bearing assembly 1D utilizes a tapered roller bearing and is substantially similar to the wheel support bearing assembly 1 utilizing the angular contact ball bearing shown in and described with reference to FIGS. 1 to 3, except that in place of the balls, tapered rollers are employed as the rolling elements 6 with the outboard and inboard raceway grooves 2a and 2b, 3a and 3b shaped to represent a conical configuration. FIG. 8 illustrates the manner in which the driven wheel is rotatably supported by the wheel support bearing assembly ID utilizing a tapered roller bearing.

Other structural features of the wheel support bearing assembly 1D than those described above are similar to those of the wheel support bearing assembly 1 in the previously described first embodiment and, therefore, will not be reiterated for the sake of brevity.

In a sixth preferred embodiment of the present invention shown in FIG. 9, the wheel support bearing assembly 1E is substantially similar to the wheel support bearing assembly 1A shown in the form of the double row angular contact ball bearing assembly for rotatably supporting the driven wheel as shown in and described with reference to FIG. 4, except that in place of the balls, tapered rollers are employed as the rolling elements 6 to render the wheel support bearing assembly to be in the form of a double row tapered roller bearing assembly.

Other structural features of the wheel support bearing assembly 1E than those described above are similar to those of the wheel support bearing assembly 1A in the previously described second embodiment and, therefore, will not be reiterated for the sake of brevity.

Figure 10:
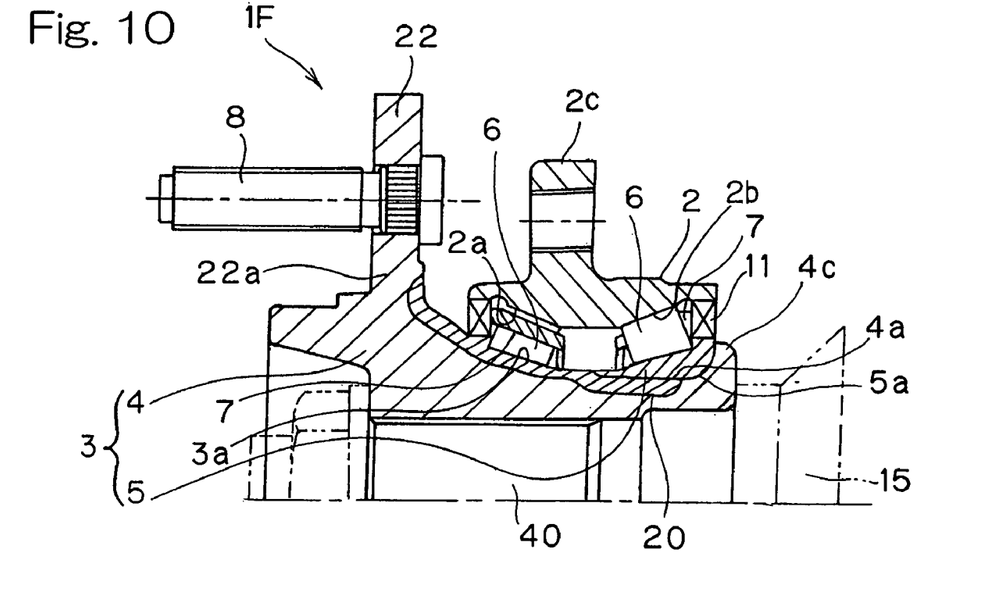
FIG. 10 is a fragmentary longitudinal sectional view of the wheel support bearing assembly according to a seventh preferred embodiment of the present invention.

In a seventh preferred embodiment of the present invention shown in FIG. 10, the wheel support bearing assembly 1F is similar to the wheel support bearing assembly 1D shown in and described with reference to FIG. 7, but is applied to support a drive wheel. In this embodiment, the hub axle 4 has the axially extending bore 40 defined therein.

Other structural features of the wheel support bearing assembly 1F than those described above are similar to those of the wheel support bearing assembly 1D in the previously described fifth embodiment with reference to FIG. 7 and, therefore, will not be reiterated for the sake of brevity.

Figure 11:
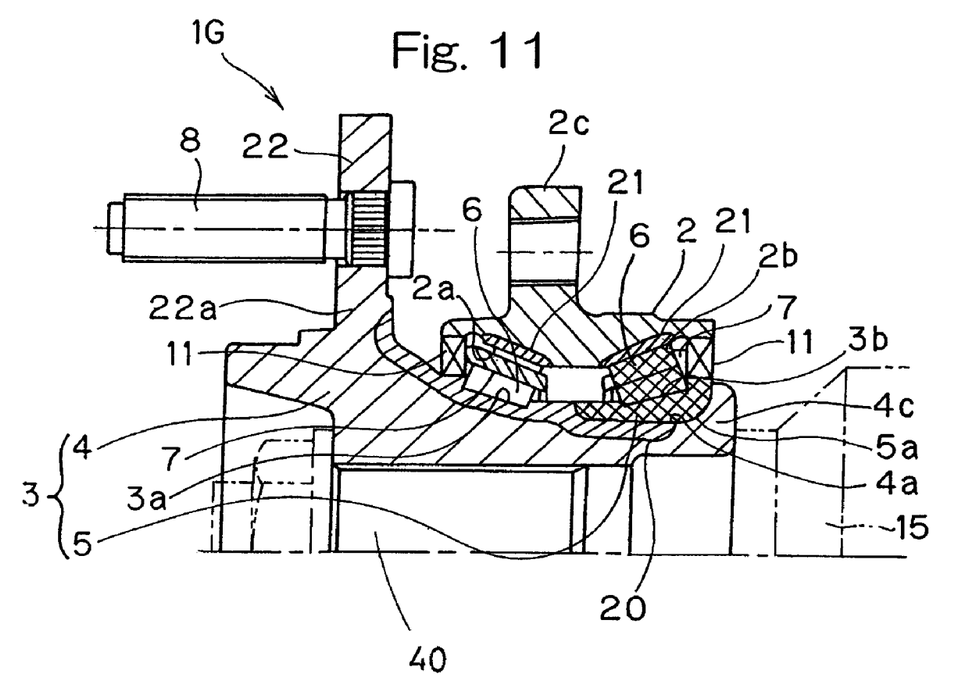
FIG. 11 is a fragmentary longitudinal sectional view of the wheel support bearing assembly according to an eighth preferred embodiment of the present invention.

An eighth preferred embodiment of the present invention will now be described with particular reference to FIG. 11. The wheel support bearing assembly 1G is similar to the wheel support bearing assembly 1E shown in and described with reference to FIG. 9, but is applied to support a drive wheel. In this embodiment, the hub axle 4 has the axially extending bore 40 defined therein.

Figure 9:
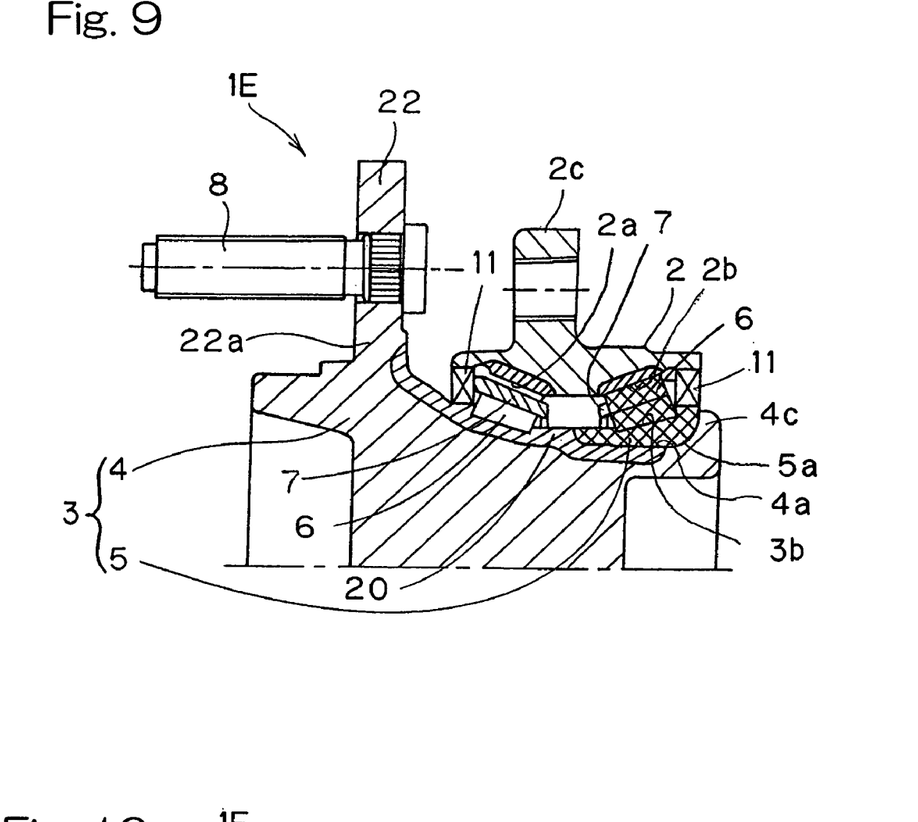
FIG. 9 is a fragmentary longitudinal sectional view of the wheel support bearing assembly according to a sixth preferred embodiment of the present invention.

Other structural features of the wheel support bearing assembly 1G than those described above are similar to those of the wheel support bearing assembly 1E in the previously described sixth embodiment with reference to FIG. 9 and, therefore, will not be reiterated for the sake of brevity.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly for rotatably supporting a vehicle wheel, said wheel support bearing assembly comprising:
   an outer member having an inner peripheral surface formed with a plurality of first raceways;
   an inner member rotatably positioned inside the outer member and having a corresponding number of second raceways defined therein in alignment with the first raceways in the outer member;
   rows of rolling elements rollingly received in part within the first raceways and in part within the second raceways;
   said inner member including a hub axle, made of carbon steel, having outboard and inboard ends opposite to each other and a hub flange integrally formed on an outer peripheral surface of the hub axle at a location adjacent the outboard end thereof, and an inner race member;
   said hub axle having a radially inwardly depressed mount defined on its outer peripheral surface at a location adjacent the inboard end thereof, said inner race member being fixedly mounted on the depressed mount, one of the second raceways in the inner member being defined in an outer peripheral surface of the inner race member while the other second raceway is defined in the outer peripheral surface of the hub axle;
   said inner race member having a radially inner end edge, delimited between an inner peripheral surface thereof and an annular inboard end face thereof, which is chamfered to represent a rounded inner end corner, said inner race member being fixed on the depressed mount by means of an annular end stop that is formed by staking the inboard end of the hub axle so as to protrude radially outwardly;
   a hardened layer formed on a surface portion of the outer peripheral surface of the hub axle that is delimited between a root of the hub flange on an inboard side of the hub flange and the depressed mount, wherein the hardened layer has an inboard end so positioned as to extend to a position between said one of the second raceways and the rounded inner end corner of the inner race member; and
   a hardened layer formed on respective surface areas of the first raceways of the outer member.

2. The wheel support bearing assembly as claimed in claim 1, wherein the hardened layer has a surface hardness within the range of 58 to 60 HRC and has a depth not smaller than 0.5 mm.

3. The wheel support bearing assembly as claimed in claim 1, wherein the wheel support bearing assembly utilizes a double row angular contact ball bearing.

4. The wheel support bearing assembly as claimed in claim 1, wherein the wheel support bearing assembly utilizes a double row tapered roller bearing.

5. A wheel support bearing assembly for rotatably supporting a vehicle wheel, the wheel support bearing assembly comprising:
   an outer member having
      an inner peripheral surface formed with a plurality of first raceways, and
      outer member hardened layers formed on respective surface areas of the first raceways;
   an inner member rotatably positioned inside the outer member and having a plurality of second raceways corresponding to and respectively aligning with the first raceways, the inner member comprising
      a hub axle, having
         opposing outboard and inboard ends,
         a radially inwardly depressed mount defined on an outer peripheral surface of the hub axle at a location adjacent the inboard end,
         a hub flange integrally formed on the outer peripheral surface of the hub axle at a location adjacent the outboard end thereof, and
         an inner member hardened layer formed on a surface portion of the outer peripheral surface of the hub axle, one of the second raceways being defined on the hardened layer, and
      an inner race member fixedly mounted on the depressed mount, one of the second raceways being defined in an outer peripheral surface of the inner race member; and
   rows of rolling elements rollingly received in part within the first raceways and in part within the second raceways,
   wherein the inner member hardened layer extends axially between a position on the depressed mount inboard of the one of the second raceways defined in the inner race member and a root of the hub flange on an inboard side of the hub flange.

* * * * *